(12) United States Patent
Shvodian (10) Patent No.: US 7,573,865 B2
(45) Date of Patent: Aug. 11, 2009

(54) METHOD OF SYNCHRONIZING A WIRELESS DEVICE USING AN EXTERNAL CLOCK

(75) Inventor: William M. Shvodian, McLean, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 464 days.

(21) Appl. No.: 11/229,598

(22) Filed: Sep. 20, 2005

(65) Prior Publication Data

US 2007/0064742 A1    Mar. 22, 2007

(51) Int. Cl.
*H04J 3/06* (2006.01)
(52) U.S. Cl. .......................................... 370/350
(58) Field of Classification Search ............. 370/350
See application file for complete search history.

(56) References Cited

U.S. PATENT DOCUMENTS

| | | | | |
|---|---|---|---|---|
| 2004/0185857 A1* | 9/2004 | Lee et al. | ............. | 455/445 |
| 2005/0107103 A1 | 5/2005 | Melpignano | | |
| 2005/0162208 A1* | 7/2005 | Zhang et al. | ............. | 327/276 |
| 2005/0276322 A1* | 12/2005 | Best | ............. | 375/239 |
| 2006/0138650 A1* | 6/2006 | Hidalgo et al. | ............. | 257/728 |
| 2006/0165130 A1 | 7/2006 | Wissell et al. | | |
| 2006/0256820 A1* | 11/2006 | Ilnicki et al. | ............. | 370/503 |
| 2007/0103324 A1* | 5/2007 | Kosuge et al. | ............. | 340/618 |

OTHER PUBLICATIONS

International Search Report and Written Opinion correlating to PCT/US06/36472, dated Sep. 10, 2008.

* cited by examiner

*Primary Examiner*—Patrick N Edouard
*Assistant Examiner*—Eric Elcenko (57) ABSTRACT

A method is provided for operating a dual-use wireless device. The method includes: receiving an external timing signal at a first wireless circuit in the device; synchronizing a first clock in the first wireless circuit with the external timing signal; sending a first internal timing signal from the first wireless circuit to a second wireless circuit in the device, after the synchronizing; and listening for a remote periodic control signal at the second wireless circuit for a set monitoring time, a start of the monitoring time being based on the first internal timing signal. The second wireless circuit sends an association request if the second wireless circuit hears the remote periodic control signal within the monitoring time, and sends a local periodic control signal if the second wireless circuit does not hear the remote periodic control signal within the monitoring time.

18 Claims, 9 Drawing Sheets

METHOD OF SYNCHRONIZING A WIRELESS DEVICE USING AN EXTERNAL CLOCK

FIELD OF THE INVENTION

The present invention relates in general to the operation of a wired or wireless network, and more particularly to a method of allowing a wireless device to synchronize its operation using a clock signal external to the wireless device or any related wireless network.

BACKGROUND OF THE INVENTION

In ad hoc networking environments, networks can be created by different devices at different times, meaning that without receiving some information from the network, it is impossible for a new device to determine what existing device is acting to coordinate a network, or exactly how the timing of the network is synchronized. The choice of coordinating device and the particular timing choices are made when a network first starts, and generally cannot be predicted without information from the network.

In a typical ad hoc networking environment, when a new device desires to communicate with other nearby devices, it will perform one of two tasks: joining an existing network, or creating a network of its own with itself as a network coordinator. In either case, however, this requires finding other devices that also desire to communicate with the new device. If joining an existing network, the new device will need to find the device currently coordinating the existing network. If creating a new network, the device will need to find at least one other existing device desiring to join the new network and willing to accept the new device as a network coordinator. In both cases the new device will have to synchronize its timing to that of the existing device.

When finding an existing network, the new device must first listen to a desired channel until it hears a signal identifying the existing network, e.g., a periodic control signal that provides network information. In one embodiment this identifying signal could be a beacon signal from a network coordinator. Based on the new device's knowledge of general network operation, the timing of the network identifying signal, and information contained in the network identifying signal, the new device can then make an association request, asking to join the existing network. The network coordinator of the existing network will process this association request and provide the new device with instructions to join the network.

When starting a new network, the new device must generate its own signals identifying the new network, e.g., its own beacon signals, and wait to receive association requests from nearby devices desiring to join the new network. If the new device receives any such association requests, the new device can process them and accept nearby devices into the new network.

However, any given device has no information regarding the identity of any of the nearby devices, nor does it have any information as to how the timing of any existing devices are set. As a result, a device trying to identify the existence and timing of an existing network or device will have to listen for the device or network long enough to ensure that it hears the proper synchronization information. This is at odds with power saving modes that many devices have, which may have low duty cycles and long off-times.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as an embedded processor and software therefore or application specific ICs. It is expected that one of ordinary skill, notwithstanding possibly significant effort and many design choices -motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

Wireless Network

Figure 1:
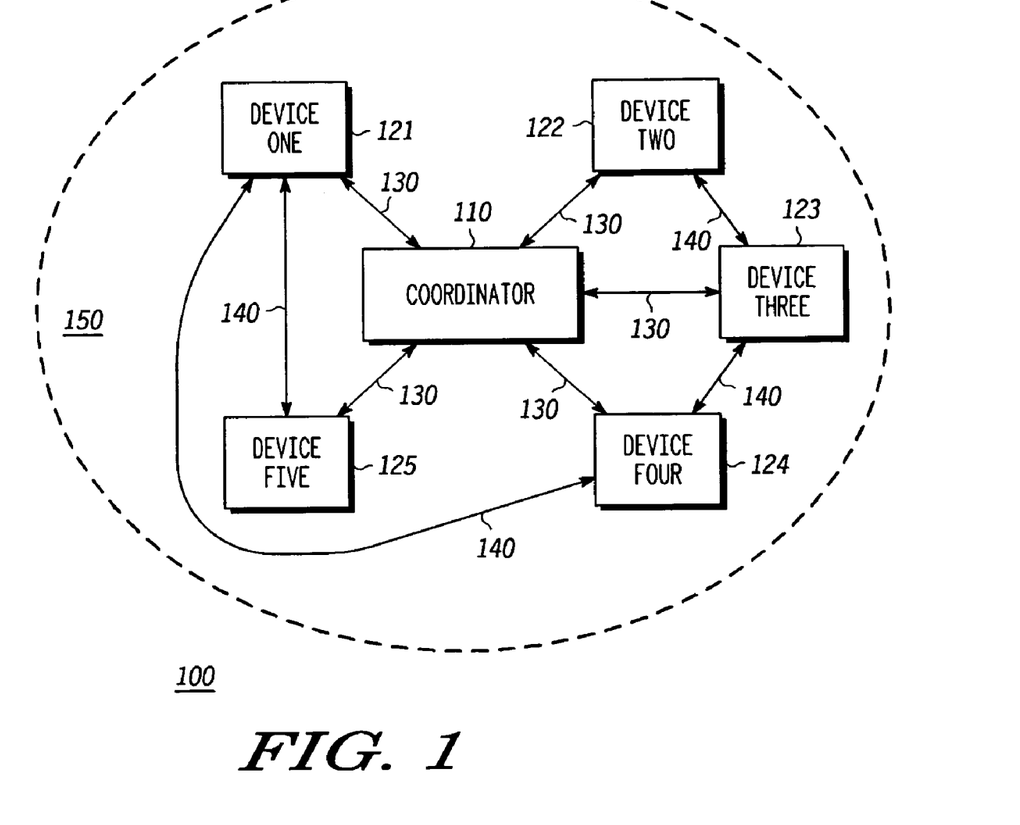
FIG. 1 is a block diagram of a wireless network according to a disclosed embodiment of the present invention.

FIG. 1 is a block diagram of a wireless network 100 according to a disclosed embodiment of the present invention. In this embodiment the network 100 is a wireless personal area network (WPAN), or piconet. However, it should be understood that the present invention also applies to other settings where bandwidth is to be shared among several users, such as, for example, wireless local area networks (WLAN), or any other appropriate wired or wireless network.

When the term piconet is used, it refers to a wireless network of devices connected in an ad hoc fashion, having one device act as a coordinator (i.e., it functions as a master) while the other devices (sometimes called stations) follow the time allocation instructions of the coordinator (i.e., they function as slaves). The coordinator can be a designated device, or simply one of the devices chosen to function as a coordinator. One primary difference between the coordinator and non-coordinator devices is that the coordinator must be able to communicate with all of the devices in the network, while the various non-coordinator devices need not be able to communicate with all of the other non-coordinator devices.

shown in FIG. 1, the network 100 includes a coordinator 110 and a plurality of devices 121-125. The coordinator 110 serves to control the operation of the network 100. As noted above, the system of coordinator 110 and devices 121-125 may be called a piconet, in which case the coordinator 110 may be referred to as a piconet coordinator (PNC). Each of the non-coordinator devices 121-125 must be connected to the coordinator 110 via primary wireless links 130, and may also be connected to one or more other non-coordinator devices 121-125 via secondary wireless links 140, also called peer-to-peer links.

In addition, although FIG. 1 shows bi-directional links between devices, they could also be shown as unidirectional links. In this case, each bi-directional link 130, 140 could be shown as two unidirectional links, the first going in one direction and the second going in the opposite direction.

In some embodiments the coordinator 110 may be the same sort of device as any of the non-coordinator devices 121-125, except with the additional functionality for coordinating the system, and the requirement that it communicates with every device 121-125 in the network 100. In other embodiments the coordinator 110 may be a separate designated control unit that does not function as one of the devices 121-125.

In some embodiments the coordinator 110 will be a device just like the non-coordinator devices 121-125. In other embodiments the coordinator 110 could be a separate device dedicated to that function. Furthermore, individual non-coordinator devices 121-125 could include the functional elements of a coordinator 110, but not use them, functioning as non-coordinator devices. This could be the case where any device is a potential coordinator 110, but only one actually serves that function in a given network.

Each device of the network 100 may be a different wireless device, for example, a cellular telephone, a global positioning system (GPS) device, a digital still camera, a digital video camera, a personal data assistant (PDA), a digital music player, a laptop personal computer, a desktop personal computer, or other personal wireless device.

The various non-coordinator devices 121-125 are confined to a usable physical area 150, which is set based on the extent to which the coordinator 110 can successfully communicate with each of the non-coordinator devices 121-125. Any non-coordinator device 121-125 that is able to communicate with the coordinator 110 (and vice versa) is within the usable area 150 of the network 100. As noted, however, it is not necessary for every non-coordinator device 121-125 in the network 100 to communicate with every other non-coordinator device 121-125.

Although a wireless network is described with reference to FIG. 1, and the disclosure refers to this wireless network by way of example, the current claimed invention is equally applicable to wired networks. By way of example the present claimed invention could be applied to wireless networks of the sort defined by the IEEE 802.11 standard or the IEEE 803.15.3 standard, the proposed IEEE 802.15.3b standard, by a wired Ethernet network, or to any other suitable wired or wireless network.

Superframes

The available bandwidth in a given network 100 may be split up in time by the coordinator 110 into a series of repeated superframes. These superframes define how the available transmission time is split up among various tasks. Individual frames of data are then transferred within these superframes in accordance with the timing set forth in the superframe.

Figure 2:
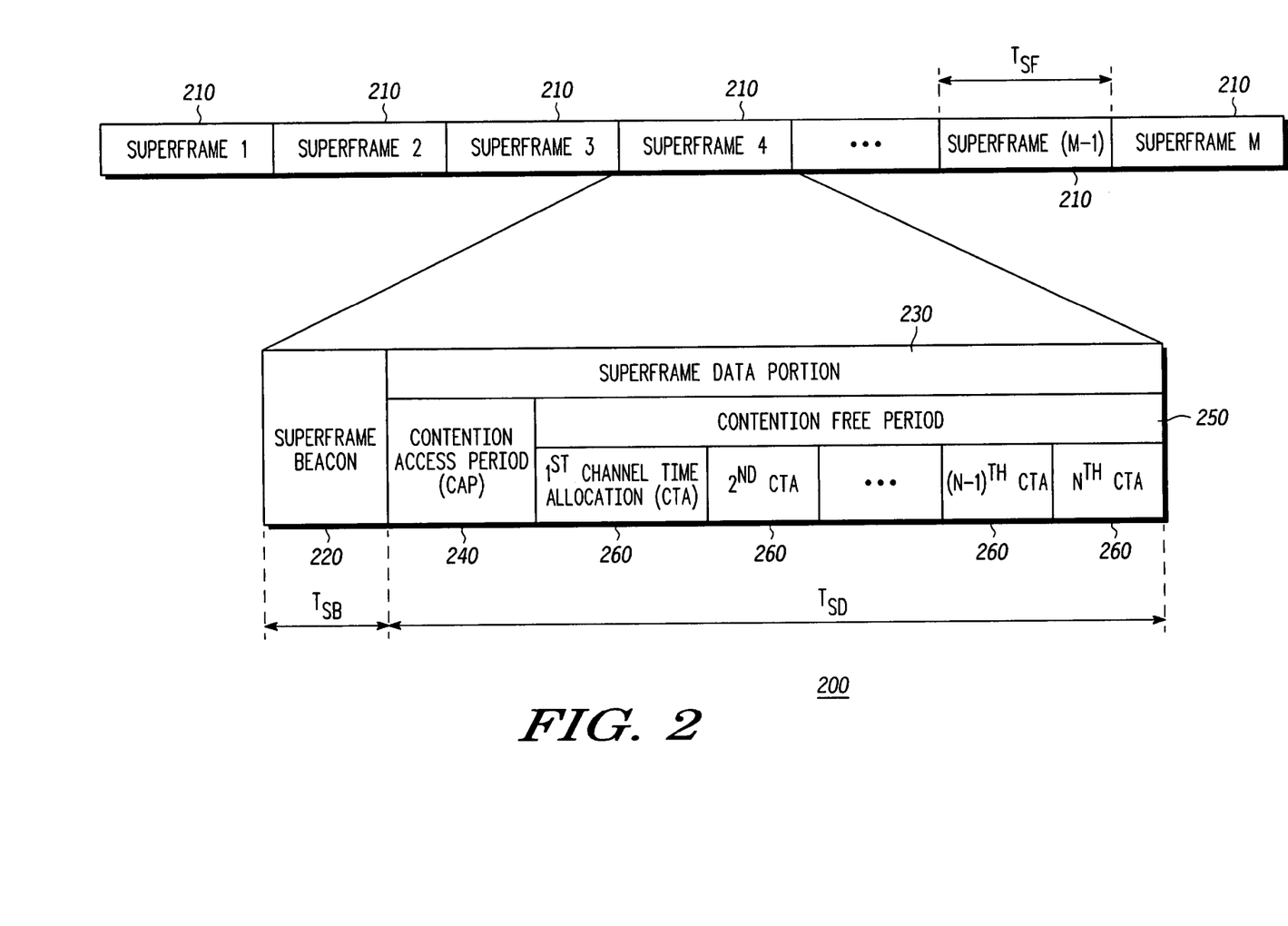
FIG. 2 is a block diagram of a TDMA scheme including superframes, according to a disclosed embodiment of the present invention.

FIG. 2 is a block diagram of a TDMA scheme including superframes and channel time allocations according to a disclosed embodiment of the present invention. As shown in FIG. 2, the available transmission time 200 is broken up into a plurality of consecutive superframes 210, each superframe having a set superframe duration $T_{SF}$.

The superframes 210 in this embodiment each include a superframe beacon 220 during which beacon data is passed from a coordinator device to one or more, and a superframe data portion 230 during which data is passed. The superframe beacon 220 has a beacon duration $T_{SB}$; and the superframe data portion 230 has a superframe data portion duration $T_{SD}$.

The superframe data portion 230 can be further divided into a contention access period (CAP) 240, and a contention free period (CFP) 250. The contention free period 250 can then be further broken up into a plurality of channel time allocations (CTAs) 260 (also called time slots).

The beacon period 220 is set aside for the coordinator 110 to send a beacon frame out to the non-coordinator devices 121-125 in the network 100. Such a beacon frame will include information for organizing the operation of devices within the superframe 210. Each non-coordinator device 121-125 knows how to recognize a beacon period 220 prior to joining the network 100 so that it can identify the existing network 100 and properly make an association request to join the network 100. Once in the network 100, the non-coordinator device 121-125 uses the beacon 220 both to coordinate communication within the network 100.

The beacon frame provides information required by the devices 121-125 in the network 100 regarding how the individual channel time allocations 260 will be allocated. In particular, it notes how and when devices 110, 121-125 can transmit to prevent any two devices from interfering.

The CAP 240 is used to transmit commands or asynchronous data across the network 100. In particular, the CAP 240 can be used in some embodiments to provide a time for devices 121-125 outside of the network 100 to make association requests to join the network 100. The CAP 240 may be eliminated in many embodiments and the system would then pass commands solely during the CFP 250.

The CFP 250 includes a plurality of channel time allocations 260. These channel time allocations 260 are each assigned by the coordinator 110 to one or more transmitting devices 110, 121-125 and one or more receiving devices 110, 121-125 for transmission of information between them. Generally each transmitting device will have a single associated receiver, through in some cases a single transmitter will transmit to multiple receivers at the same time. In embodiments without a CAP 240, certain CTAs 260 may be allocated for accepting association requests.

The channel time allocations 260 are provided to allow contention-free communication between devices 120, 121-125. They do so in accordance with the information set forth in the beacon 220. The size of the channel time allocations 260 can vary by embodiment, but it should be large enough to transmit one or more data frames.

Although the embodiments described in this document are in the context of a WPAN (or piconet), it should be understood that the present invention also applies to other settings where bandwidth is to be shared among several users, such as, for example, wireless local area networks (WLAN), other appropriate wireless network, or any wired or wireless transmission scheme in which bandwidth must be shared.

The superframes 210 are fixed time constructs that are generally repeated in time. The specific duration of the superframe 210 is described in the beacon 220. In fact, the beacon 220 generally includes information regarding how often the beacon 220 is repeated, which effectively corresponds to the duration of the superframe 210. The beacon 220 also contains information regarding the network 100, such as the identity of the transmitters and receivers assigned to each channel time allocation 260, the necessary transmission parameters for signals within a channel time allocation 260, and the identity of the coordinator 110.

The system clock for the network 100 is preferably synchronized through the generation and reception of the beacons 220 once devices 121-125 are in the network 100. Each non-coordinator device 121-125 will store a synchronization point time upon successful reception of a valid beacon 220, and will then use this synchronization point time to adjust its own timing.

Creation of Networks and Association of New Devices

Although FIG. 1 describes a network 100 with a coordinator 110 and a plurality of non-coordinator devices 121-125, at its inception, a network 100 can start with just two devices, one of which will take the role of coordinator 110, and one of which will take the role of a non-coordinator device 121-125.

Typically when a device begins operation it will look for an existing network 100 to join. If it does not find a network 100 it may then either go into a sleep mode for a time to save power, waking later to again look for an existing network 100, or it may set itself as a coordinator 110, start its own network 100, send out a beacon 220, and begin looking for other devices that may wish to join the network 100.

If no devices respond with an association request after one or more beacons 220 have been sent, the new coordinator 110 might then enter a sleep mode to save power. Having determined that there are no devices wishing to join a network, the device will wait for a time and check again for nearby devices.

Because of the use of power-saving sleep modes, new devices, whether looking to join an existing network 100 or to start their own network 100 may only spend a short time either looking for a network 100 or looking for devices to join a network 100. The may actually spend a larger amount of time in a sleep mode to conserve power. As a result, two devices within range of each other might continually miss each other, each being in a sleep mode when the other is in a waking mode and vice versa. Unless their monitoring processes were sufficiently extensive, each would remain under the false impression that there were no other devices within range. And extensive monitoring processes themselves consume power. Thus, while long sleep times used by devices during sleep modes may improve power savings, the correspondingly longer monitoring processes required to look for adjacent devices will decrease power savings.

Figure 3:
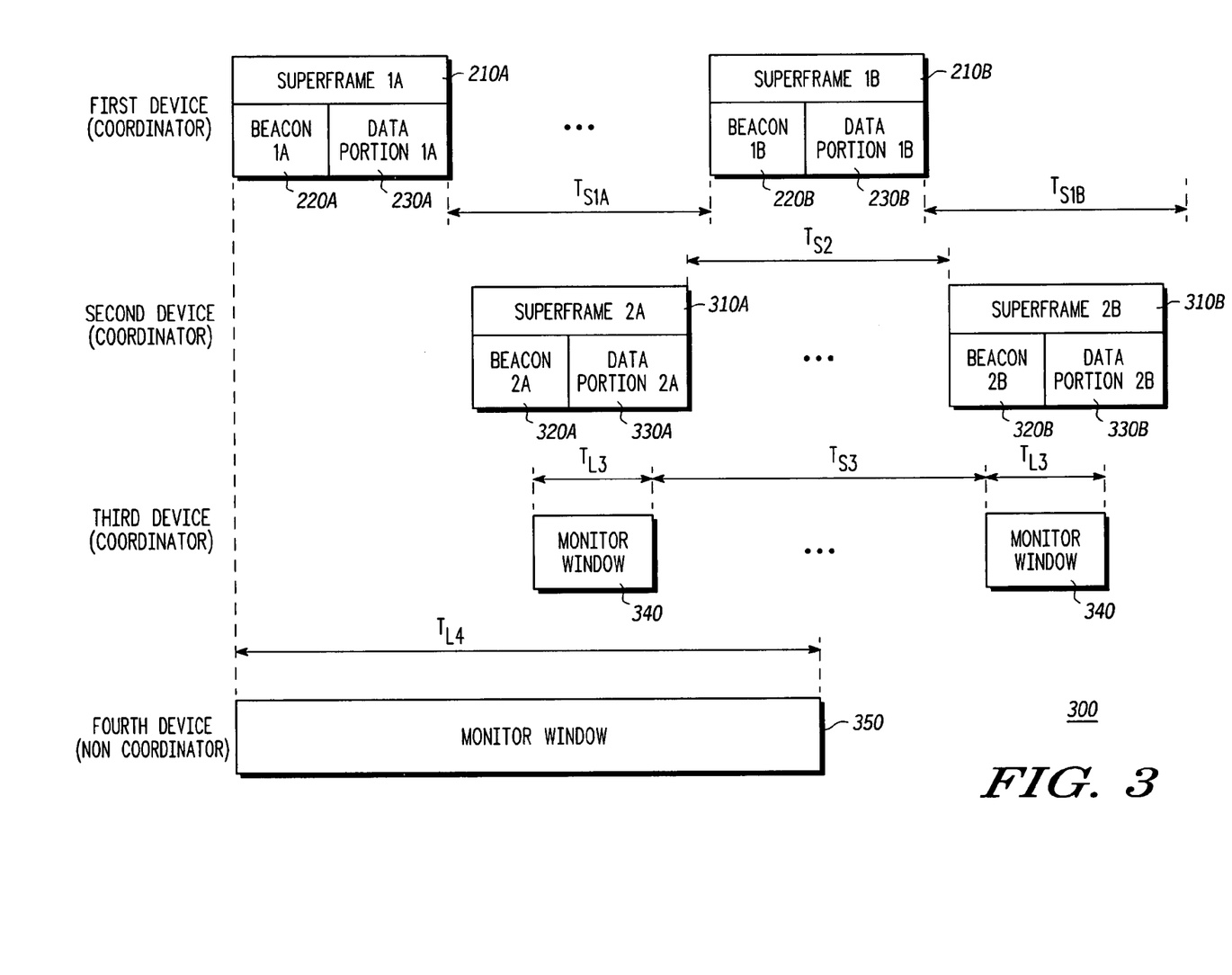
FIG. 3 is a block diagram of the timing for the creation of and association with networks according to a disclosed embodiment of the present invention.

FIG. 3 is a block .diagram of the timing for the creation of and association with networks 100 according to a disclosed embodiment of the present invention. FIG. 3 shows the timing for first, second, third, and fourth devices within a given locality. Each device begins being unaware of the existence of any other device. The first and the second devices operate as coordinator devices 110, attempting to start a new network 100, inviting new devices to join. The third and fourth devices operate as non-coordinator devices 121-125, seeking an existing network 100 to join.

Consider the situation in which the first and the second devices are within range of each other. As shown in FIG. 3, the first device begins by transmitting a beacon-1A 220A, defining a superframe-1A 210A. The superframe-1A 220A will provide an opportunity in a data portion-1A 230A for other devices that have heard the beacon-1A 220A to join a network 100 using the first device as a coordinator 110. This opportunity could come in a CAP 240 or a CFP 250 in the data portion-1A 230A.

If no other device issues an association request to the first device during the data portion-1A 230A, the first device will assume that there are no devices in range that desire to join and will enter a sleep mode for a first device sleep period-A $T_{S1A}$.

At the end of the first sleep period-A $T_{S1A}$, the first device will transmit a new beacon-1B 220B, defining a superframe-1B 210B. The superframe-1B 220B will provide a new opportunity in a data portion-1B 230B for other devices that have heard the beacon-1B 220B to join a network 100 using the first device as a coordinator 110.

Again, if no other device issues an association request to the first device during the data portion-1B 230B, the first device will once more assume that there are no devices in range that desire to join and will enter a sleep mode for a first device sleep period-B $T_{S1B}$. The first device sleep period-A $T_{S1A}$ and the first device sleep period-B $T_{S1B}$ may be the same or may vary in different embodiments.

This cycle of waking to send a beacon and then returning to a sleep mode can continue until either the device determines that it no longer wants to create a network 100, it is shut off, or it finds another device and starts a new network 100.

Similarly, the second device begins by transmitting a beacon-2A 320A, defining a superframe-2A 310A. The superframe-2A 320A will provide an opportunity in a data portion-2A 330A for other devices that have heard the beacon-2A 320A to join a network 100 using the second device as a coordinator 110. This opportunity could come in a CAP 240 or a CFP 250 in the data portion-2A 330A.

If no other device issues an association request to the second device during the data portion-2A 330A, the second device will assume that there are no devices in range that desire to join and will enter a sleep mode for a second device sleep period-A $T_{S2A}$.

At the end of the second device sleep period-A $T_{S2A}$, the second device will transmit a new beacon-2B 320B, defining a superframe-2B 310B. The superframe-2B 320B will provide a new opportunity in a data portion-2B 330B for other devices that have heard the beacon-2B 320B to join a network 100 using the second device as a coordinator 110.

Again, if no other device issues an association request to the second device during the data portion-2B 330B, the second device will assume that there are no devices in range that desire to join and will enter a sleep mode, continuing this cycle of waking to send a beacon and then returning to a sleep mode until either the second device determines that it no longer wants to create a network, it is shut off, or it finds another device and starts the network.

Although FIG. 3 shows the first and second devices as each sending a single beacon 220A, 320A, defining a single superframe respectively 210A, 310A, before entering a sleep mode, this is by way of example only. Each could send a series of superframes before entering a sleep mode. And the number of superframes sent between sleep cycles could vary or remain constant.

As shown in FIG. 3, it is entirely possible that the first and second devices will remain out of sync, i.e., the times the first device is transmitting a beacon 220A, 220B, are times when the second device is asleep, and vice versa, unless one scans the entire sleep interval to find the other (as with the monitor window 350). Typically the beacon length $T_{SB}$ is on the order of about 100 μs, the superframe length $T_{SF}$ is on the order of 10-65.5 ms, and the superframe sleep periods $T_{S1A}$, $T_{S1B}$, $T_{S2A}$ are on the order of hundreds of ms to several seconds. This means that even if multiple beacons are broadcast in a row between sleep periods, the times when a device is asleep will likely be greater than the time when the device is awake.

A similar situation will occur when one of the devices intends to become a non-coordinator device 121-125 and is simply looking for an existing network 100 to join. Consider the case where the first and third devices are in operation within range of each other. The first device operates as described above.

The third device will enter a waking mode for a set third monitor window 340, having a third device listening period $T_{L3}$, during which it will listen for a beacon 220. If it hears a beacon 220 during the third monitor window 340, it will send an association request during the proper time in the data portion 230 following the beacon 220. If it does not hear a beacon 220 during the third monitor window 340, it will enter into a sleep mode for a third device sleep period $T_{S3}$.

At the end of the third device sleep period $TS_3$, the third device will once more enter a waking mode and again listen for a beacon 220. This cycle of waking to listen for a beacon 220 and then returning to a sleep mode can continue until either the third device determines that it no longer wants to join a network, it is shut off, or it finds a coordinator 110 and joins that coordinator's network 100.

As shown in FIG. 3, it is entirely possible that the times the first device is transmitting a beacon 220A, 220B, are times when the third device is asleep, and the times that the third device is listening are times when the first device is asleep. As a result, both the first device and the third device might be completely unaware of the other, despite the fact that they are actually looking for each other.

As noted above, typically the beacon length $T_{SB}$ is on the order of about 100 μs, the superframe length $T_{SF}$ is on the order of 10-65.5 ms, and the first and second device sleep periods $T_{S1A}$, $T_{S1B}$, $T_{S2A}$ are on the order of hundreds of ms to several seconds. In addition, the third device sleep period $T_{S3}$ is also typically on the order of hundreds of ms to several seconds. This means that even if multiple beacons 220 are broadcast in a row between sleep periods, the times when a device is asleep will likely be greater than the time when the device is awake.

The only way a listening (i.e., non-coordinator) device can be certain to hear any beacons 220 that are being broadcast is to have the length of its monitor window be longer by two beacon lengths than the longest possible sleep period in a network 100 it's listening for.

Consider the case of a fourth device designed to ensure that it will hear a transmitted beacon 220. The fourth device will enter a waking mode for a set fourth monitor window 350, having a fourth device listening period $T_{L4}$, during which it will listen for a beacon 220. If it hears a beacon 220 during the monitor window 340, it will send an association request during the proper time in the data portion 230 following the beacon 220. If it does not hear a beacon 220 during the fourth monitor window 350, it will enter into a sleep mode in a manner similar to that described for the third device.

Unlike the third device, however, the fourth device has the length of its monitor window 350 set to guarantee that it will hear any beacons being broadcast. Assuming for the sake of argument that the first device sleep period-A $T_{S1A}$ is the longest possible sleep period for the first device, this means that the fourth device listening period $T_{L4}$ must be equal to:

$$T_{L4}=2*(T_{SB})+T_{S1A} \quad (1)$$

Given this listening period $T_{L4}$, the fourth device is guaranteed that no matter when it starts listening, it will hear a beacon if another device in range is broadcasting one. However, the cost for this guarantee is that the fourth device must remain in a listening mode for a comparatively long time, which can cause a significant power drain in the fourth device in a situation in which there is no guarantee that there is even another device nearby. This can be particularly detrimental if the fourth device is powered by a battery.

External Timing Signals

Some wireless devices are dual-use devices, meaning they are capable of two different types of wireless connection. For example they may be capable of a long-range wireless connection, e.g., cellular telephone communications, global positioning system (GPS) signal monitoring, NIST clock signal monitoring, TV clock signal monitoring, or the like, as well as a short-range wireless connection, e.g., a WPAN or WLAN connection using wideband or ultrawide bandwidth (UWB) connections. In some of these dual-use devices, one of the wireless functions may involve the use of an external timing signal. For example, cellular telephone systems generally employ an external timing signal to synchronize the operation of the cell phone network. Likewise, a GPS system will employ an external clocking signal to coordinate the processing of its global positioning signals. There are also broadcast clock signals such as those used in some television broadcasts to allow video recorders and the like to synchronize their timing, or those broadcast by NIST or others to help clocks synchronize their timing.

Often these external timing signals will be continuously monitored by a first wireless circuit in the dual-use device during the device's operation. In such a case, a second wireless circuit in the dual-use device can use this external timing signal received by the first wireless circuit as a time reference to help coordinate the timing of the second wireless circuit.

Figure 4:
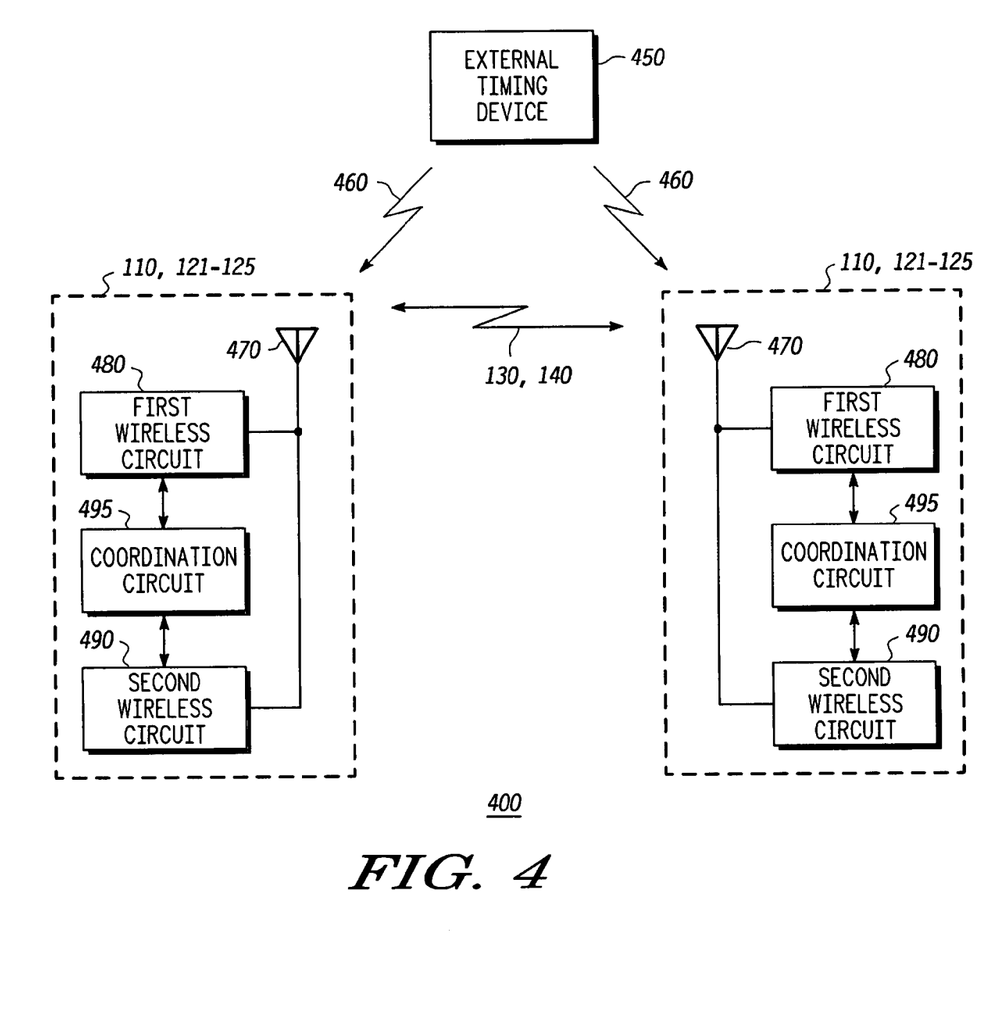
FIG. 4 is a block diagram of two multiple-use ultrawide bandwidth devices that operate in response to an external timing signal, according to a disclosed embodiment of the present invention.

FIG. 4 is a block diagram of two dual-use wireless devices with portions that operate in response to an external timing signal, according to a disclosed embodiment of the present invention. As shown in FIG. 4, two devices 110, 121-125 are provided, along with an external timing device 450. Each of the devices 110, 121-125 contains an antenna 470, a first wireless circuit 480, a second wireless circuit 490, and a coordination circuit 495.

The antenna 470 is used for the device 110, 121-125 to send and receive wireless signals to and from the first wireless circuit 480 and the second wireless circuit 490. It may be a single antenna that services both wireless circuits 480 and 490, or it may be two separate antennas, e.g., one UWB antenna and one cellular telephone antenna. In a wired embodiment, the antenna 470 could be replaced with a connection to an input/output wire.

The first wireless circuit 480 sends and receives signals in a first format from the antenna 470, operating in a known fashion. In various embodiments the second wireless circuit 490 could be a cellular telephone circuit, a GPS circuit, NIST clock signals, television clock signals, or the like. These signals include an external timing signal 460 received from an external timing device 450.

The second wireless circuit 490 sends and receives wireless signals in a second format from the antenna 470, operating in a known fashion. These could be RF signals, wideband signals, UWB signals, or the like. By way of example, a UWB circuit will be described below as the first wireless circuit. However, it should be understood that this is by way of example, and should not limit the second wireless circuit 490 in any way.

In this exemplary embodiment, the second wireless circuits 490 in the two devices 110, 121-125 communicate with each other via primary or secondary wireless links 130 or 140. If one of the devices is a coordinator device 110, then they communicate via a primary wireless link 130; if both of the devices are non-coordinator devices 121-125, then they communicate via a secondary wireless link 140.

The coordination circuit 495 facilitates communication between the first wireless circuit 480 and the second wireless circuit 490. It may physically associate with one of the first wireless circuit 480 or the second wireless circuit 490, or it may be a physically separate circuit.

The external timing device 450 provides the external timing signal 460 to each of the devices 110, 121-125. This external timing signal 460 is used by the first wireless circuit 480 in normal operation. In one embodiment the external timing device 470 is a central cellular telephone station and the external timing signal 460 is a cellular telephone clock signal; in another embodiment external timing device 470 is a GPS satellite and the external timing signal 460 is a GPS timing signal. Other embodiments can use different devices as an external timing device 480.

In each device 110, 121-125, the first wireless circuit 480 and the first wireless circuit 480 communicate with each other through the coordination circuit 495. In particular, the first wireless circuit 480 can inform the second wireless circuit 490 that an external timing signal 460 has been received. This will allow the second wireless circuit 490 in each device 110, 121-125 to synchronize with the external timing signal 460, despite the fact that their respective first wireless circuits 480 may not have been synchronized with respect to each other.

Use of an External Timing Signal to Coordinate Sending Beacons

Figure 5:
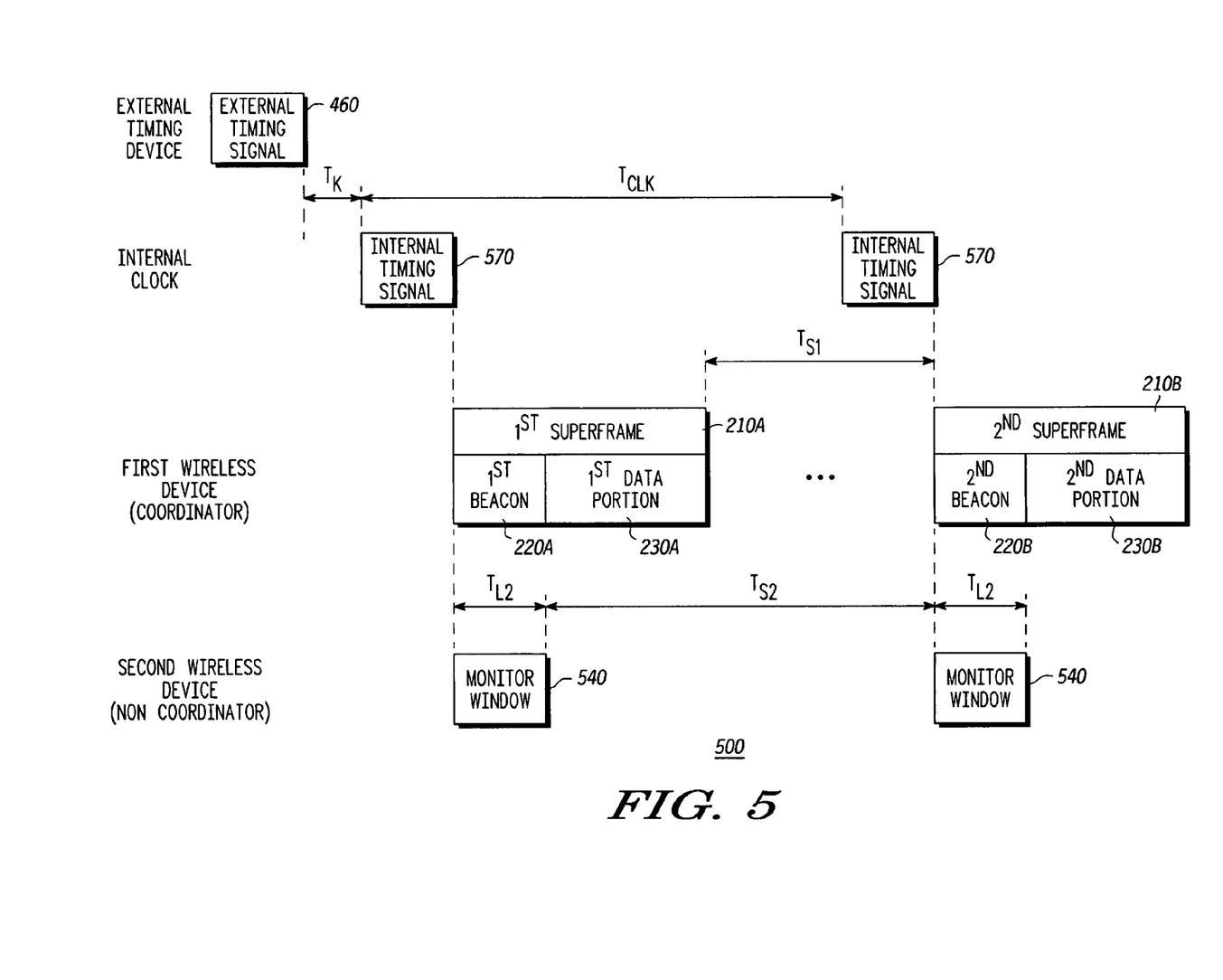
FIG. 5 is a block diagram of the timing for the creation of and association with networks using an external timing signal, according to a disclosed embodiment of the present invention.
Figure 6:
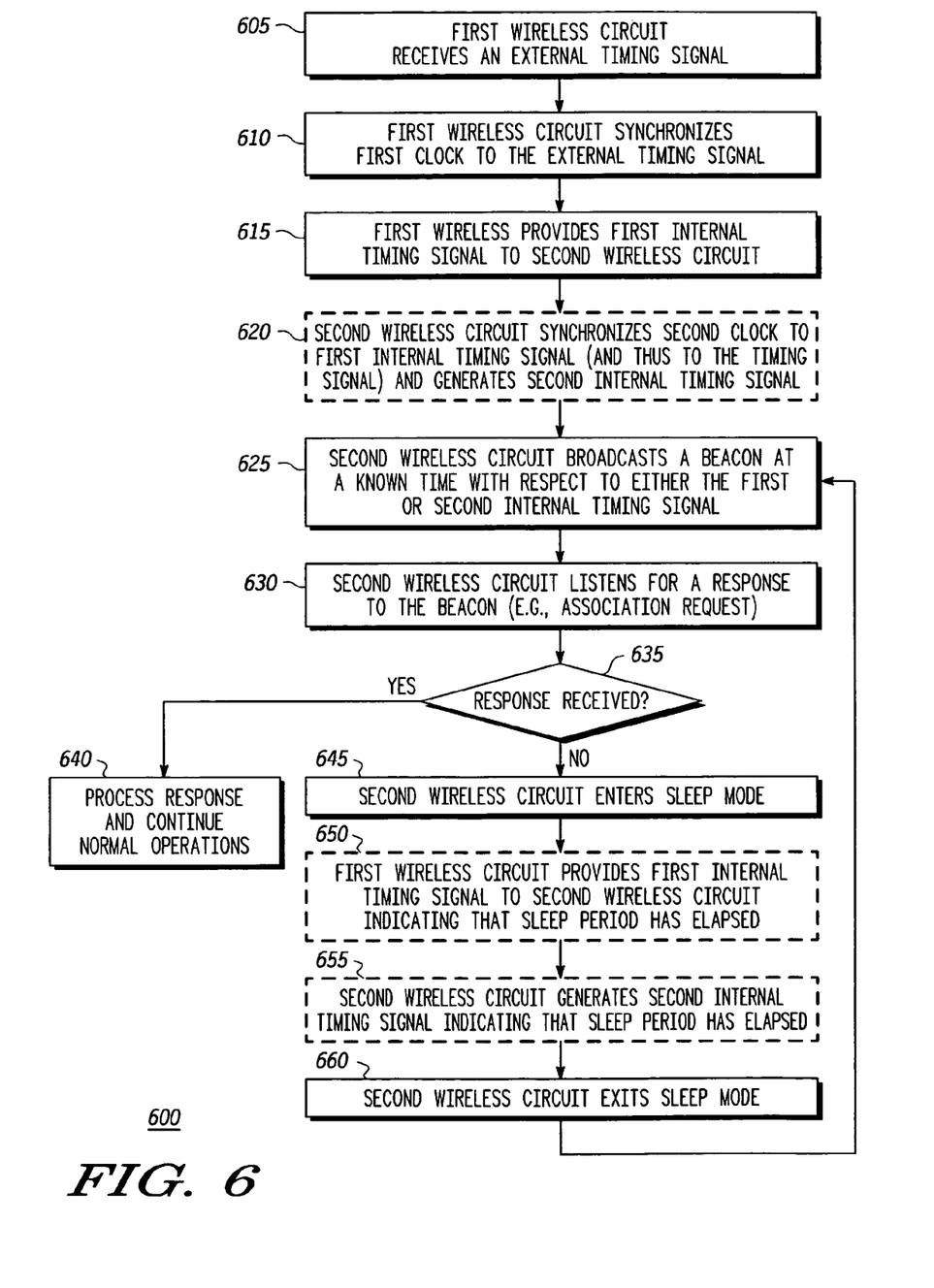
FIG. 6 is a block diagram of the timing for the creation of and association with networks using a monitoring window prior to sending a beacon, according to a disclosed embodiment of the present invention.

FIG. 5 is a block diagram of the timing for the creation of and association with networks using an external timing signal, according to a disclosed embodiment of the present invention. This embodiment uses a UWB circuit as the first wireless circuit, but this is by way of example only. The timing of FIG. 5 shows the operation of an external timing device 450, a second wireless circuit 490 in a first device acting as a network coordinator 110, and a second wireless circuit 490 in a second device acting as a non-coordinator device 121-125. FIG. 6 is a flow chart of the operation of a network device acting as a coordinator according to a disclosed embodiment of the present invention.

In the system shown in FIGS. 5 and 6, the first device is attempting to create a wireless network 100 (i.e., a UWB network in this example), and is looking for other devices to join. The second device is looking to join an existing wireless network 100. The first and second devices are dual-use devices, containing both a first wireless circuit 480 (e.g., a cellular telephone circuit) and a second wireless circuit 490 (e.g., a UWB circuit), as described with respect to FIG. 4. In addition, the second wireless circuits 490 in both the first and the second devices are capable of entering a sleep mode to conserve power.

As shown in FIG. 5, an external timing device 450 periodically transmits an external timing signal 460, with a known time between external timing signals 460. This time between external timing signals may be fixed or may vary, but should be predictable to the dual-use devices.

A first wireless circuit 480 in the first device receives the external timing signal 460 (605) and synchronizes its second clock to the received timing signal. (610).

The first wireless circuit 480 in the first device then provides a first internal timing signal to the second wireless circuit 490 in the first device based on the second clock. (615). This first internal timing signal could be a timing signal that directly instructs the second wireless circuit 490 to take some action, or it could be used by the second wireless circuit 490 for synchronization of its own second clock. In the latter case, the second wireless circuit 490 synchronizes its second clock to the timing information from the first wireless circuit 480 (and thus to the external timing signal, to which the first clock is synchronized) and generates its own second internal timing signal. (620)

Regardless, the first device produces an internal timing signal 570 that is generated a known time $T_K$ after the transmission by the external timing device 450 of an external timing signal 460. The second wireless circuit 490 in the first device can use the internal timing signal 570 (whether a first internal timing signal received from the first wireless circuit 480 or second internal timing signal generated within the second wireless circuit 490), to set the time for broadcasting a beacon.

The second wireless circuit 490 in the first device uses the internal timing signal (first or second, as appropriate to the embodiment) as a trigger to send out a first beacon 220A, defining a first superframe 210A. (625) Following the transmission of the first beacon 220A, the second wireless circuit 490 listens during an appropriate time during the first data portion 230A, in the first superframe 210A, for any response to the first beacon 220A, e.g., an association request from a nearby device. (630)

If the second wireless circuit 490 in the first device does receive an association request during the first data portion 230A (635), it will process that response and continue network operation. (640) If the second wireless circuit 490 in the first device does not receive an association request during the first data portion 230A (635), it will enter a sleep mode for a first sleep period $T_{S1}$. (645) In one embodiment in which the second wireless circuit 490 is a UWB circuit, a typical association wait time is in the range of 10 to 200 microseconds.

The length of the first sleep period $T_{S1}$ will be set based on the gaps between internal timing signals 570. In particular the first sleep period $T_{S1}$ will be the time between two internal timing signals 570. These may be adjacent internal timing signals 570, or they may be internal timing signals 570 separated by one or more other internal timing signals 570. Whichever of the first wireless circuit 480 or the second wireless circuit 490 in the first device that generate the internal timing signal 570 can be tasked to mark the time accordingly to determine when the internal timing signal 570 corresponding to the end of the sleep period is received or should be generated (depending upon the particular embodiment).

Thus, in an embodiment in which the second wireless circuit 490 does not synchronize its first clock to the external timing signal 460, the first wireless circuit 480 in the first device will determine when the first sleep period $T_{S1}$ has elapsed and will send a (first) internal timing signal 570 to the second wireless circuit 490 in the first device indicating that the first sleep period $T_{S1}$ has elapsed. (650)

Similarly, in an embodiment in which the second wireless circuit 490 does synchronize its first clock to the external timing signal 460, the second wireless circuit 490 in the first device will determine when the first sleep period $T_{S1}$ has elapsed and generate a (second) internal timing signal 570 indicating this fact. (655)

The second wireless circuit 490 in the first device then uses the internal timing signal 570 (whether first or second) as a trigger to exit the sleep mode (660) and to send out a second beacon 220B, defining a second superframe 210B. (625) Following the transmission of the second beacon 220B, the second wireless circuit 490 in the first device listens during an appropriate time during a second data portion 230B for any association request from a nearby device. (630)

If the second wireless circuit 490 in the first device does receive an association request during the second data portion 230B (635), it will process that association request and continue network operation to allow a new device to join the network 100. (640) If the second wireless circuit 490 in the first device does not receive an association request during the second data portion 230B (635), it will again enter a sleep mode (645), repeating this process until either it successfully receives an association request, it receives instructions to stop looking for new devices, or it is shut off.

In this way, the dual use device can schedule the timing of the beacons (or more generally any periodic control signal) relative to the timing of the external timing signal 460 by synchronizing the timing of the internal timing signal 570 to that of the external timing signal 460. Each dual-use device will synchronize its own internal timing signal 570 to this known, global external timing signal 460. The particulars of how the internal timing signals 570 are generated (e.g., frequency, period, etc.) and how a beacon 220 (or other periodic control signal) is sent based on the internal timing signals 570 will be known to each device (either in a first or second wireless circuit 480 or 490). Once their internal timing signals 570 are all synchronized to the same external timing signal 460, each device will know when beacons 220 (or other periodic control signals) are being sent.

Although this method discloses a single synchronizing event with the external timing signal, the receipt of the external timing signal 460 can be performed periodically to maintain proper synchronization between the external timing signal 460 and the first clock in the first wireless circuit 480. And if the second wireless circuit 490 also synchronizes its second clock to the external timing signal 460, this synchronization can likewise be periodically repeated throughout operation.

In addition, although not shown, this process may provide other ways to exit the processing loop 600. For example, the second wireless circuit 490 in the first device might monitor the number of times a beacon 220 is sent out and exit the loop 600 if a certain number of beacons 220 pass without response.

Use of a Delay after an External Timing Signal to Avoid Beacon Collisions

Because the second wireless circuits in the wireless devices (i.e., UWB devices in the disclosed embodiment) are synchronizing with the same external timing signal 460, two or more would-be network coordinators 110 might transmit a beacon at exactly the same time, i.e., a known time $T_K$ after a first wireless circuit 480 receives of an external timing signal 460. This could cause the beacons 220 to collide, making neither of them readable to any device listening. And since each would-be coordinator 110 would be transmitting, not listening, neither of the colliding devices would be able to hear the other. In order to avoid such collisions, a delay can be used in some embodiments between when a dual-use wireless device receives an external timing signal 460 and when the first wireless circuit in that device broadcasts a beacon to try and create a new network 100.

This delay can be random or set in some predictable fashion such as being chosen from a predetermined set of possible delay times. But it should provide for the likelihood that individual would-be network coordinators 110 will likely delay a different amount of time from when they receive the external clocking signal 460. This delay can vary from zero up to a maximum delay amount. In one embodiment in which the second wireless circuit is a UWB circuit, this delay can vary between 10 microseconds to 100 milliseconds.

Furthermore, because each would-be network coordinator 110 could also operate as a non-coordinator 121-125, a given device can use this delay period as a monitor window for the second wireless circuit 490 to listen to a second wireless channel for a beacon 220 from another would-be coordinator 110. If the second wireless circuit 490 in the current device hears another beacon 220 during this monitor window, it can request to join that network rather than trying to start its own. And if the delay time is determined such that multiple adjacent devices are unlikely to choose the same delay time, then the use of such a delay will reduce the chance of a collision between two beacons transmitted by second wireless circuits 490 in two or more adjacent devices.

Figure 7:
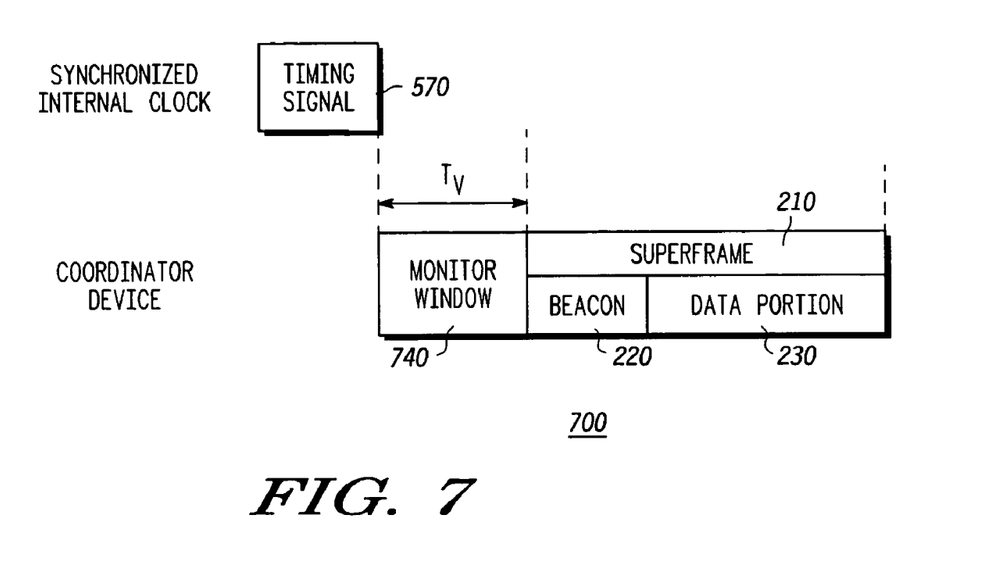
FIG. 7 is a flow chart of the operation of a network device acting as a coordinator according to a disclosed embodiment of the present invention.
Figure 8:
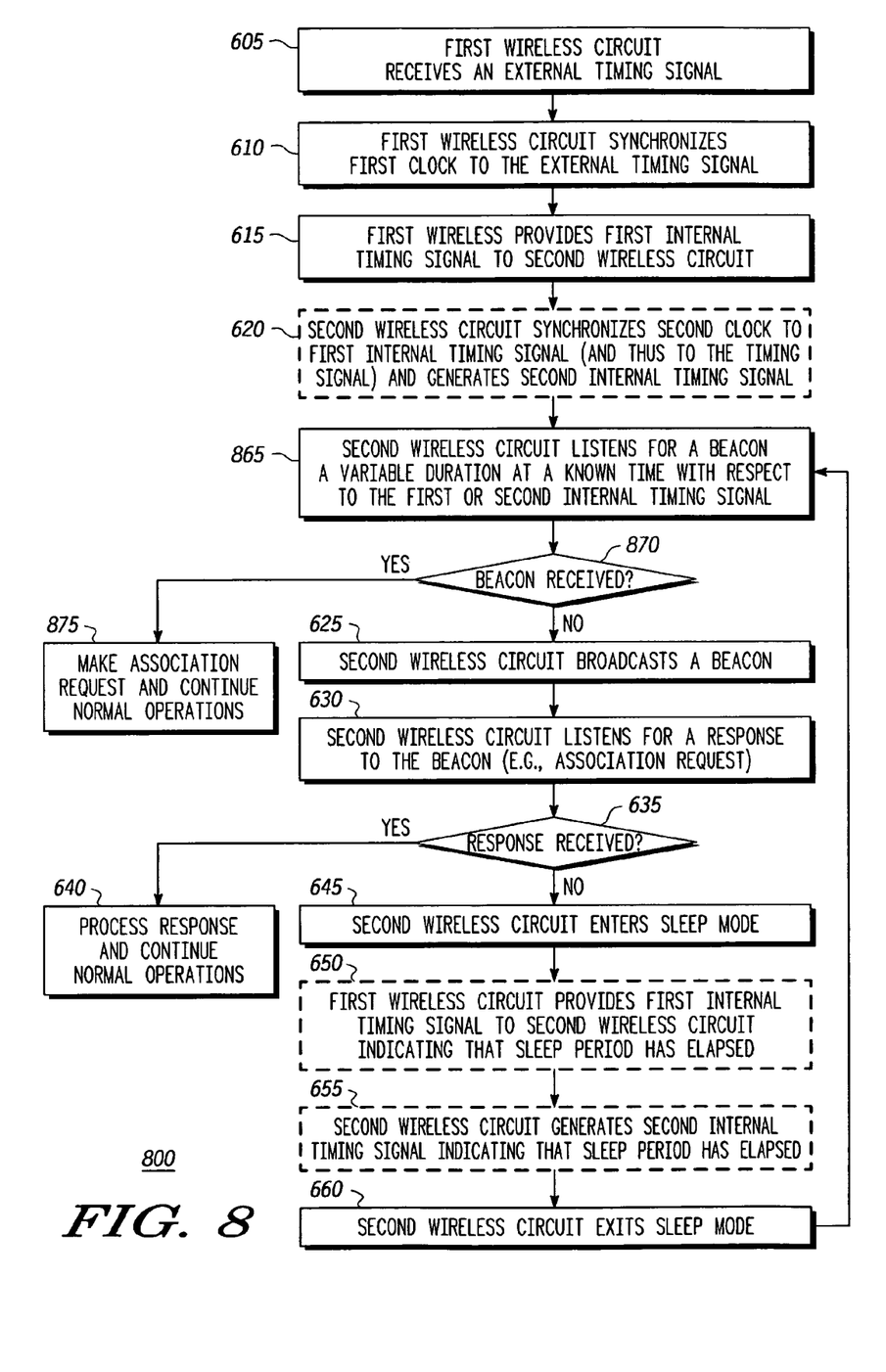
FIG. 8 is a flow chart of the operation of a network device acting as either a coordinator or a non-coordinator according to a disclosed embodiment of the present invention.

FIG. 7 is a block diagram of the timing for the creation of and association with networks using a monitoring window prior to sending a beacon, according to a disclosed embodiment of the present invention. FIG. 8 is a flow chart of the operation of a dual-use wireless device in which its second wireless circuits act as either a coordinator or a non-coordinator according to a disclosed embodiment of the present invention.

As shown in FIGS. 7 and 8, the first wireless circuit 480 in a dual-use device that would act as coordinator receives an external timing signal 460 from an external timing device 450 (605), and synchronizes its first clock to the external timing signal 460. (610)

The first wireless circuit 480 then provides a first internal timing signal to the second wireless circuit 490 based on its first clock. (615). This could be an internal timing signal that directly instructs the second wireless circuit 490 to take some action, or it could be used by the second wireless circuit 490 for synchronization of its own second clock. In the latter case, the second wireless circuit 490 synchronizes its second clock to the first internal timing signal from the first wireless circuit 480 (and thus to the external timing signal, to which the second clock is synchronized) and generates its own second internal timing signal. (620)

Regardless, the first device produces an internal timing signal 570 that is generated a known time $T_K$ after the transmission by the external timing device 450 of an external timing signal 460. The internal timing signal 570 could be a first internal timing signal generated by the first wireless circuit 480 or a second internal timing signal generated by the second wireless circuit 490. However for ease of description, it is referred to in FIG. 7 as an internal clock signal 570, regardless of its origin.

In response to the internal timing signal 570, either received from the first wireless circuit 480 (i.e., the first internal timing signal) or generated by the second wireless circuit 490 (i.e., the second internal timing signal), the second wireless circuit 490 enters into a monitor window period 740 during which it listens for a beacon 220 for a variable wait time $T_V$. (865) If the wait time $T_V$ happens to be zero, the monitor window 740 can be eliminated, and the process becomes as described with respect to FIG. 6.

If during the monitor window 740 the second wireless circuit 490 receives a beacon 220 (870) then it will make an association request based on the information in that beacon 220, and continue normal network operations as a non-coordinator device 121-125 in another network 100. (875)

If, however, the second wireless circuit 490 does not receive a beacon 220 during the monitor window 640 (870) then it will broadcast a beacon 220 (625) and listen for a response to the beacon 220, e.g., an association request. (630)

If the second wireless circuit 490 determines that a response, e.g., an association request, has been received (635) within an appropriate part of the data portion 230 after the beacon 220, then it processes the response and proceeds with normal network operation. (640) If, however, the second wireless circuit 490 determines that a response has not been received (635), it then enters into a sleep mode. (645)

The length of the sleep period that the second wireless circuit 490 remains in the sleep mode will be set based on the gaps between internal timing signals 570. In particular the sleep period will be the time between two internal timing signals 570. These may be adjacent internal timing signals 570, or they may be internal timing signals 570 separated by one or more other internal timing signals 570. Whichever of the first wireless circuit 480 or the second wireless circuit 490 in the first device that generate the internal timing signal 570 can be tasked to mark the time accordingly to determine when the internal timing signal 570 corresponding to the end of the sleep period is received or should be generated (depending upon the particular embodiment).

Thus, in an embodiment in which the second wireless circuit 490 does not synchronize its second clock to the external timing signal 460, the first wireless circuit 480 in the first device will determine when the sleep period has elapsed and will send an internal timing signal 570 to the second wireless circuit 490 in the first device indicating that the sleep period has elapsed. (650)

Similarly, in an embodiment in which the second wireless circuit 490 does synchronize its second clock to the external timing signal 460, the second wireless circuit 490 in the first device will determine when the sleep period has elapsed and generate an internal timing signal 570 indicating this fact. (655)

The second wireless circuit 490 in the first device then uses the internal timing signal 570 as a trigger to exit the sleep mode (660) and again enter a monitor window 740 to listen for a beacon for a variable amount of time $T_V$. (865) The variable time $T_V$ may remain constant once set for each operation of this process 800, or it may change each time the second wireless circuit 490 begins a new monitor window 740. (865)

As with the process 600 of FIG. 6, the monitoring of the number of timing signals received in the process 800 may be performed by either the first wireless circuit 480 or the second wireless circuit 490. Also, as in the process 600 of FIG. 6, this process 800 may provide other ways to exit the processing loop 800.

Use of an External Timing Signal to Coordinate Listening for Beacons

Figure 9:
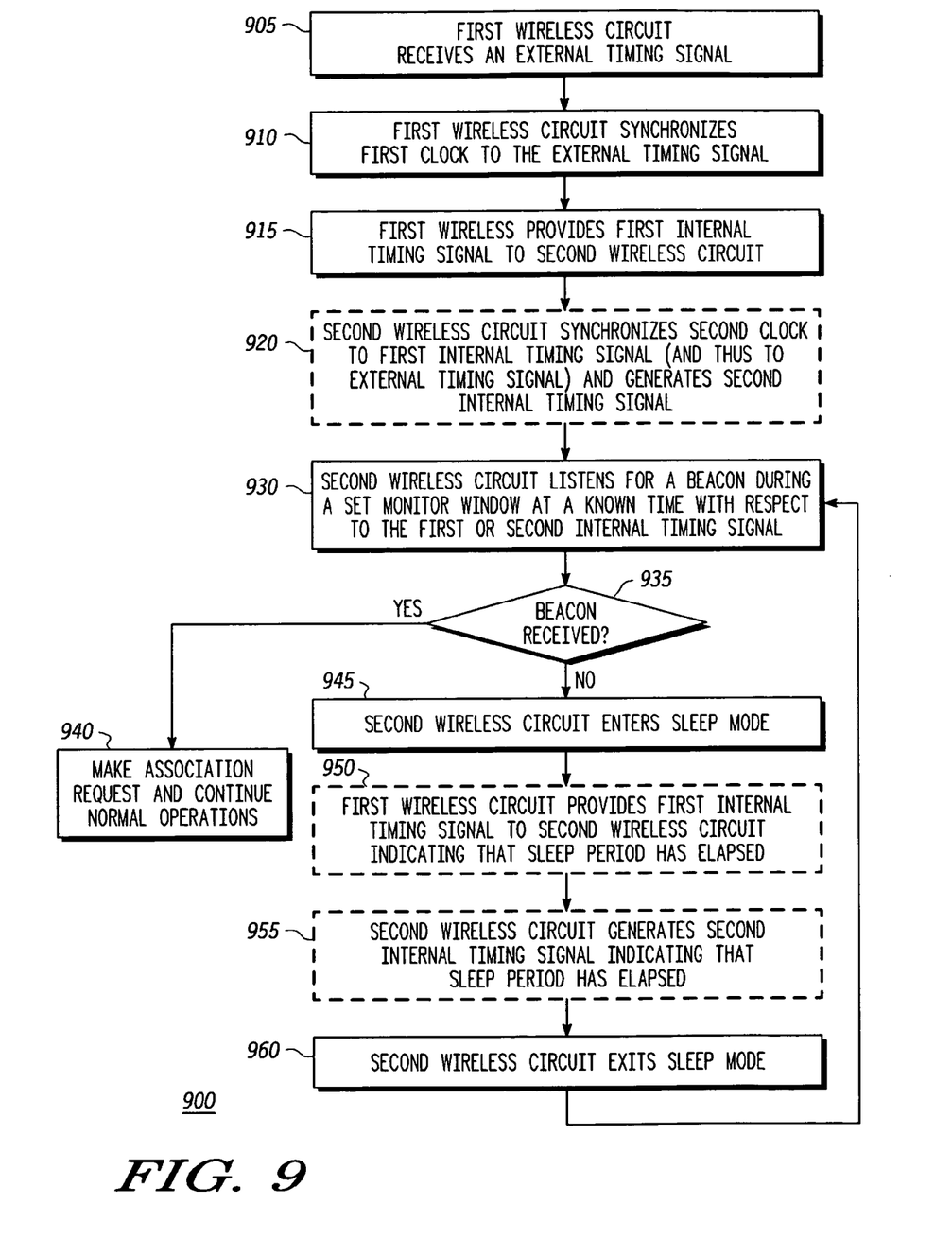
FIG. 9 is a flow chart of the operation of a network device acting as a non-coordinating device according to a disclosed embodiment of the present invention.

In the system shown in FIGS. 5 and 9, a second wireless circuit 490 in a second device is attempting to find and join an existing wireless network 100. The second device is a dual-use device, containing both a first wireless circuit 480 and a second wireless circuit 490, as described with respect to FIG. 4. As with the first device described with respect to FIGS. 5 and 6, the second wireless circuit 490 in the second device is a UWB device, though this can change in alternate embodiments.

FIG. 9 is a flow chart of the operation of a network device acting as a non-coordinating device 121-125 according to a disclosed embodiment of the present invention.

As shown in FIGS. 5 and 9, a first wireless circuit 480 in the second device receives the external timing signal 460 (905) and synchronizes its first clock to the received timing signal. (910).

The first wireless circuit 480 in the second device then provides a first internal timing signal to the second wireless circuit 490 in the second device based on the first clock. (915). This could be a timing signal that directly instructs the second wireless circuit 490 to take some action, or it could be used by the second wireless circuit 490 for synchronization of its own second clock. In the latter case, the second wireless circuit 490 synchronizes its second clock to the first internal timing signal from the first wireless circuit 480 (and thus to the external timing signal, to which the first clock is synchronized) and generates its own second internal timing signal. (920)

Regardless, the second device produces an internal timing signal 570 that is generated a known time $T_K$ after the transmission by the external timing device 450 of an external timing signal 460. The second wireless circuit 490 in the second device can use the internal timing signal 570 (whether a first internal timing signal received from the first wireless circuit 480 or second internal timing signal generated within the second wireless circuit 490), to set the time for listening for a broadcast a beacon.

The second wireless circuit 490 in the second device uses the internal timing signal 570 as a trigger to start listening for a beacon 220 for a set monitor window 540. (930) Although shown as being the same size as the beacons 220A, 220B, the monitor window 540 can be larger, e.g., to account for delays in the first device broadcasting a beacon 220. Regardless, it should be of sufficient size to allow enough time after the external timing signal 460 for the second wireless circuit 490 in the second device to hear any beacon 220 that is being transmitted, even if a maximum allowable delay is employed by a coordinator device 10 between receiving the external timing signal 460 and broadcasting a beacon 220.

If the second wireless circuit 490 in the second device does hear a beacon 220 during the monitor window 540 (935), it will send an association request at an appropriate time and format in response to the received beacon 220 and then proceed with normal network operation as a non-coordinator device 121-125 in the network 100. (940)

If, however, the second wireless circuit 490 in the second device determines that no beacon 220 has been received by the end of the monitor window 540 (935) then it enters into a sleep mode for a second sleep period $T_{S2}$. (945)

The length of the second sleep period $T_{S2}$ will be set based on the gaps between internal timing signals 570. In particular the second sleep period $T_{S2}$ will be the time between two internal timing signals 570. These may be adjacent internal timing signals 570, or they may be internal timing signals 570 separated by one or more other internal timing signals 570. Whichever of the first wireless circuit 480 or the second wireless circuit 490 in the second device that generates the internal timing signal 570 can be tasked to mark the time accordingly to determine when the internal timing signal 570 corresponding to the end of the second sleep period $T_{S2}$ is received or should be generated (depending upon the particular embodiment).

Thus, in an embodiment in which the second wireless circuit 490 in the second device does not synchronize its second clock to the external timing signal 460, the first wireless circuit 480 in the second device will determine when the second sleep period $T_{S2}$ has elapsed and will send an internal timing signal 570 to the second wireless circuit 490 in the second device indicating that the second sleep period $T_{S2}$ has elapsed. (950)

Similarly, in an embodiment in which the second wireless circuit 490 in the second device does synchronize its second clock to the external timing signal 460, the second wireless circuit 490 in the second device will determine when the second sleep period $T_{S2}$ has elapsed and generate an internal timing signal 570 indicating this fact. (955)

The second wireless circuit 490 in the second UWB device uses the internal timing signal as a trigger to exit the sleep mode (960) and to begin another monitor window period 540 in which is listens for a beacon 220. (930)

If the second wireless circuit 490 in the second device does hear a beacon 220 during this new monitor window 540 (935), it will make an association request at the appropriate time and continue operation as a non-coordinator device 121-125 in the new network 100. (940) If the second wireless circuit 490 in the second device does not hear a beacon 220 within the monitor window (935), it will again enter sleep mode (945), repeating this process until either it hears a beacon 220 and successfully joins a network 100, it receives instructions to stop looking, or it is shut off.

Because the second wireless circuits 490 in the first and second devices are coordinating their sleep modes and waking modes based on an external timing signal 460 that each of their corresponding first wireless circuits hear, the length of a required monitor window 540 is significantly reduced. The second wireless circuits 490 in the first device will always send out a beacon 220A, 220B a known time $T_K$ after receipt of an external timing signal 460. The second wireless circuits 490 in the second device need only listen for a monitor window 540 at this same time, the monitor window 540 being long enough to make certain any beacon 220A, 220B is heard. After this time the second device will know that no beacons will be transmitted and so can safely enter a sleep mode until the proper amount of time has passed for the next beacon 220 to be sent. Since the first and second devices are both synchronized to the external timing signal 460, they will be able to calculate this sleep time in the same way to get the same result.

Although FIG. 5 shows that the second wireless circuit 490 in the first device only sends a single beacon 220A prior to entering a sleep mode (i.e., for the first sleep period $T_{S1}$), in alternate embodiments it could send multiple beacons 220, defining multiple superframes 210, prior to entering a sleep mode.

Furthermore, although FIG. 5 shows that the first and second beacons 220A, 220B are sent immediately after receipt of the internal timing signal 570, there will actually be a processing delay between receiving the internal timing signal 570 and sending a beacon 220A, 220B. This accounts for circuit delays to process the internal timing signal 570, which may be greater if the first wireless circuit 480 in a dual-use device generates the internal timing signal 570 to control operation of the second wireless circuit 490. However, for ease of disclosure, the first and second beacons 220A, 220B are shown as being generated right after the external timing signal 460.

Also, although FIG. 5 shows only two devices operating in a given area, multiple devices could be operating at the same time. This means that multiple non-coordinator devices 121-125 could be listening for beacons 220 at the same time, and multiple would-be network coordinators 110 could be sending out beacons 220 at the same time.

This process may also provide other ways to exit the processing loop 900. For example, the second wireless circuit 490 in a the second device might monitor the number of times the device enters a monitor window 540, and exit the loop 900 if a certain number of monitor windows 540 pass without detecting a beacon 220.

This monitoring process can also be used by non-coordinator devices 121-125 in the embodiment of FIGS. 7 and 8. In this case, any device desiring simply to become a non-coordinator device and join an existing network should set its own monitor window 540 to be long enough to account for the length of a beacon 220 plus the longest possible variable wait time $T_v$. This way even if there is only a single device transmitting a beacon 220 and it chooses the maximum variable wait time $T_v$, the monitor window 540 of the non-coordinator device 121-125 will still be long enough for the device to hear the beacon 220.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A method of transmitting a periodic control signal in a dual-use wireless device, comprising:

receiving an external timing signal at a first wireless circuit in the dual-use wireless device;

synchronizing a first clock in the first wireless circuit with the external timing signal;

sending a first internal timing signal from the first wireless circuit to a second wireless circuit in the dual-use wireless device, after synchronizing the first clock with the external timing signal;

waiting for a delay time after the sending of the first internal timing signal from the first wireless circuit to the second wireless circuit;

broadcasting the periodic control signal at the second wireless circuit based on the first internal timing signal after waiting for the delay time;

synchronizing a second clock in the second wireless circuit with the first internal timing signal; and generating a second internal timing signal in the second wireless circuit, after synchronizing the second clock with the first internal timing signal, wherein the delay time is one of: randomly determined, or iteratively chosen from a predetermined set of possible delay times, and wherein the periodic control signal is broadcast in response to the second internal timing signal.

2. A method of transmitting a periodic control signal, as recited in claim 1, wherein the external timing signal is one of a global positioning system signal, a cell phone timing signal, a television clock signal, and a broadcast clock signal.

3. A method of transmitting a periodic control signal, as recited in claim 1, wherein the second wireless circuit is an ultrawide bandwidth circuit.

4. A method of transmitting a periodic control signal, as recited in claim 1, wherein the method is implemented in an integrated circuit.

5. A method of transmitting a periodic control signal in a dual-use wireless device, comprising:

receiving an external timing signal at a first wireless circuit in the dual-use wireless device;

synchronizing a first clock in the first wireless circuit with the external timing signal;

sending a first internal timing signal from the first wireless circuit to a second wireless circuit in the dual-use wireless device, after synchronizing the first clock with the external timing signal;

waiting for a delay time after the sending of the first internal timing signal from the first wireless circuit to the second wireless circuit;

broadcasting the periodic control signal at the second wireless circuit based on the first internal timing signal after waiting for the delay time;

listening for an association request at the second wireless circuit for an association wait time after broadcasting the periodic control signal;

performing an association function if the association request is received within the association wait time; and entering into a sleep mode if the association request is not received within the association wait time, wherein the delay time is one of: randomly determined, or iteratively chosen from a predetermined set of possible delay times.

6. A method of transmitting a periodic control signal, as recited in claim 5, wherein the external timing signal is one of a global positioning system signal, a cell phone timing signal, a television clock signal, and a broadcast clock signal.

7. A method of transmitting a periodic control signal, as recited in claim 5, wherein the second wireless circuit is an ultrawide bandwidth circuit.

8. A method of transmitting a periodic control signal, as recited in claim 5, wherein the method is implemented in an integrated circuit.

9. A method of operating a dual-use wireless device, comprising:

receiving an external timing signal at a first wireless circuit in the dual-use wireless device;

synchronizing a first clock in the first wireless circuit with the external timing signal;

sending a first internal timing signal from the first wireless circuit to a second wireless circuit in the dual-use wireless device, after synchronizing the first clock with the external timing signal;

listening for a remote periodic control signal at the second wireless circuit in the dual-use device for a set monitoring time, a start time of the set monitoring time being based on the first internal timing signal;

sending an association request from the second wireless circuit if the second wireless circuit hears the remote periodic control signal within the set monitoring time; and sending a local periodic control signal from the second wireless circuit if the second wireless circuit does not hear the remote periodic control signal within the set monitoring time.

10. A method of operating a dual-use wireless device, as recited in claim 9, wherein the timing signal is one of a global positioning system signal, a cell phone timing signal, a television clock signal, and a broadcast clock signal.

11. A method of operating a dual-use wireless device, as recited in claim 9, further comprising:

listening at the second wireless circuit for an association request for an association wait time after sending the local periodic control signal;

performing an association function if the association request is received within the association wait time; and entering into a sleep mode if the association request is not received within the association wait time.

12. A method of operating a dual-use wireless device, as recited in claim 9, wherein the second wireless circuit is an ultrawide bandwidth circuit.

13. A method of operating a dual-use wireless device, as recited in claim 9, wherein the method is implemented in an integrated circuit.

14. A method of operating a dual-use wireless device, comprising:

receiving an external timing signal at a first wireless circuit in the dual-use wireless device;

synchronizing a first clock in the first wireless circuit with the external timing signal;

sending a first internal timing signal from the first wireless circuit to a second wireless circuit in the dual-use wireless device, after synchronizing the first clock with the external timing signal;

listening for a remote periodic control signal at the second wireless circuit in the dual-use device for a set monitoring time, a start time of the set monitoring time being based on the first internal timing signal; and broadcasting a local periodic control signal from the second wireless circuit based on the first internal timing signal if the second wireless circuit does not hear the remote periodic control signal within the monitoring time.

15. A wireless communication device, as recited in claim 14, wherein the first wireless circuit is one of a cellular telephone circuit, a global positioning system receiver, a television receiver, and a broadcast clock receiver.

16. A method of operating a dual-use wireless device, as recited in claim 14, wherein the timing signal is one of a global positioning system signal, a cell phone timing signal, a television clock signal, and a broadcast clock signal.

17. A method of operating a dual-use wireless device, as recited in claim 14, wherein the second wireless circuit is an ultrawide bandwidth circuit.

18. A method of operating a dual-use wireless device, as recited in claim 14, wherein the method is implemented in an integrated circuit.

* * * * *